US006817266B1

(12) United States Patent
Brackett

(10) Patent No.: US 6,817,266 B1
(45) Date of Patent: Nov. 16, 2004

(54) STIFF METAL HUB FOR AN ENERGY STORAGE ROTOR

(75) Inventor: Norman C. Brackett, N. Reading, MA (US)

(73) Assignee: Beacon Power Corporation, Woburn, MA (US)

( * ) Notice: Subject to any disclaimer, the term of this patent is extended or adjusted under 35 U.S.C. 154(b) by 0 days.

(21) Appl. No.: 09/706,060

(22) Filed: Nov. 3, 2000

(51) Int. Cl.[7] .............................................. F16F 15/22
(52) U.S. Cl. .................................. 74/573 R; 403/360
(58) Field of Search ............................ 74/572, 573 R; 403/360

(56) References Cited

U.S. PATENT DOCUMENTS

| | | | |
|---|---|---|---|
| 4,179,951 A | 12/1979 | Theyse ........................ | 74/572 |
| 4,285,251 A | 8/1981 | Swartout ..................... | 74/572 |
| 4,821,599 A | 4/1989 | Medlicott .................... | 74/572 |
| 4,860,611 A | 8/1989 | Flanagan et al. ............. | 74/574 |
| 5,012,694 A | 5/1991 | McGrath ..................... | 74/572 |
| 5,124,605 A | 6/1992 | Bitterly et al. ................ | 310/74 |
| 5,566,588 A | 10/1996 | Bakholdin et al. ........... | 74/572 |
| 5,628,232 A | 5/1997 | Bakholdin et al. ........... | 74/572 |
| 5,634,381 A * | 6/1997 | Thoolen ...................... | 74/572 |
| 5,637,939 A * | 6/1997 | Serdar, Jr. et al. ........... | 310/74 |
| 5,732,603 A | 3/1998 | Swett et al. .................. | 74/572 |
| 5,783,883 A * | 7/1998 | Serdar, Jr. et al. ........... | 310/74 |
| 5,784,927 A * | 7/1998 | Rao et al. ................. | 74/573 R |
| 5,816,114 A | 10/1998 | Gregoire et al. ............. | 74/572 |
| 5,946,979 A | 9/1999 | Waagepetersen ............. | 74/572 |
| 5,962,941 A * | 10/1999 | Serdar, Jr. et al. .......... | 310/153 |
| 6,014,911 A | 1/2000 | Swett .......................... | 74/572 |
| 6,175,172 B1 * | 1/2001 | Bakholdin et al. ............ | 310/74 |

FOREIGN PATENT DOCUMENTS

WO    WO 97/13313    4/1997

OTHER PUBLICATIONS

International Search Report dated Apr. 4, 2002 (4 pgs.).
Copy of International Preliminary Examination Report.

* cited by examiner

*Primary Examiner*—David M. Fenstermacher
(74) *Attorney, Agent, or Firm*—David G. Conlin, Esq.; John J. Penny, Jr.; Edwards & Angell, LLP

(57) ABSTRACT

Several embodiments of a stiff, metallic hub for an energy storage devices are disclosed in the present invention. The stiff hub produces a critical velocity that is significantly greater than the design operating speed of the flywheel assembly so that resonant frequency is never reached during normal operation of the energy storage device's flywheel assembly. The stiff hub comprises a central core section that maintains a tight interference fit with the rotating shaft; an outer rim section that maintains a tight interference with the high-strength, low-density composite fiber rim, in which energy primarily is stored; and a web section that is situated therebetween, extending radially from the rotary shaft. At high operating speeds, the outer rim of the hub expands radially commensurate with expansion of the composite fiber rim so that enough of the outer rim remains in tight interference fit with the composite fiber rim to substantially minimize vibrations.

12 Claims, 3 Drawing Sheets

STIFF METAL HUB FOR AN ENERGY STORAGE ROTOR

FIELD OF THE INVENTION

The present invention relates to a metal hub for an energy storage rotor. More precisely, the invention relates to a stiff metal hub for a flywheel that maintains tight interference fit with a radially-deflecting composite rim during high-speed operation by deflecting at the hub outer rim, which minimizes vibrations, and produces a critical velocity substantially higher than the design operating velocity.

DESCRIPTION OF THE RELATED ART

Energy storage rotors, or flywheels, which internally produce and store kinetic energy, have been available as an alternative to batteries and other means of storing energy for about 30 years. Initially, flywheel assemblies were made of metal, e.g., high strength steel. However, flywheels made from composite materials provide superior energy storage capability to steel flywheels as the high-strength, lighter-weight composite flywheels can be rotated at greater speed. Recognizing that energy storage is proportional to the flywheel mass and the square of rotational velocity, substantially increasing rotational velocity and marginally decreasing mass by replacing steel with a composite material provides greater energy storage. Technological advances, thus, have made flywheel assemblies lighter in weight and capable of operating at higher operating speeds by using fiber composite materials, e.g., fiberglass or carbon fibers wound with a resin binder (carbon-carbon composite) in flywheel assemblies. The low density, high strength composite materials are ideally suited for flywheel assemblies, especially flywheel rings, which play a dominant role in overall flywheel energy storage.

High rotational operating velocities, however, produce extremely high centrifugal forces, which produce high radial and hoop stresses in the outermost composite rim. High stresses in the composite rim cause the rim to "grow" radially, i.e., to deform outwardly in a radial direction. The flywheel hub, which holds the composite rim on a rotary shaft, generally by tight interference fit, is traditionally made of a high strength, lightweight metal alloy or a composite material. Metal alloy hubs provide strength and stiffness to the flywheel assembly. However, metal hubs often do not experience radial growth commensurate with, or of the same magnitude as, the deforming composite rim. Consequently, the composite rim separates from the hub, which produces potentially deleterious vibrations. Hubs made from composite materials as a rule are more flexible, which substantially minimizes separation between the hub and the composite rim. However, composite hubs as a rule are not sufficiently stiff to produce a critical velocity that exceeds design operating speeds.

As a composite rim separates from a hub, holidays, or gaps, in the tight interference fit appear between the hub and the composite rim, causing undesirable and potentially deleterious vibrations. Such vibrations are detrimental to the operation of the flywheel assembly. Moreover, if they occur at the natural, or resonant, frequency of the flywheel assembly and/or the component parts of the flywheel assembly, these vibrations could seriously damage or altogether destroy the flywheel assembly. Thus, those of ordinary skill in the pertinent art have focused a great deal of attention on means of solving the compatibility problem associated with flywheel assemblies having lightweight, high strength composite rims.

Medlicott (U.S. Pat. No. 4,821,599) discloses an energy storage flywheel with at least one (but preferably two or more) "substantially circular dished member" having an elastic modulus less than the elastic modulus of the composite ring. As the Medlicott flywheel rotates at higher velocities, the dished member deforms elastically causing the periphery of the dished member to move outwardly radially, maintaining contact with the less elastic composite ring, which also is expanding radially. However, with dished member hubs, having a lower modulus than the composite ring, the flywheel is less rigid and, consequently, more prone to vibrate than a system with a more rigid hub. Moreover, design operating speeds typically are greater than critical velocities, requiring the flywheel system during operation to transition through the critical frequency.

Flanagan et al. (U.S. Pat. No. 4,860,611) also discloses an energy storage rotor with a flexible rim hub. The Flanagan invention provides an expanding aluminum hub design on which a composite ring is shrunk-fit. The Flanagan hub includes a plurality of spokes that are joined at the periphery by a continuous rim. The sections of the rim between adjacent spokes are purposely made thinner, thereby allowing the rim sections between adjacent spokes to flex outwardly to maintain interference fit with the composite ring. Flanagan. et al. discloses that tight interference fit at lower operating frequencies and rim flexibility at higher operating frequencies substantially minimize vibrations and separation. Indeed, Flanagan expresses that critical frequency, i.e., resonance, does not occur because the rotor reaches its design operating speed, which is well above critical velocity, rapidly "so that the rotor does not pass through potentially destructive critical frequency." However, in fact, the Flanagan flywheel system requires that the rotor pass through the critical frequency, subjecting the rotor to potentially deleterious vibrations.

Bitterly et al. (U.S. Pat. No. 5,124,605) discloses a flywheel with a "self-restoring bearing system" that comprises a hub that is joined to a composite ring by a plurality of tube assemblies. The tube assemblies, which are attached to the hub and the composite ring, allow differential radial expansion in the hub and the composite ring. Hence, radial expansion of the hub does not have to be compatible with radial expansion of the composite ring. Indeed, the hub, which has a lower modulus of elasticity and, further, is purposely designed to expand more rapidly than the composite ring, compresses the plurality of pre-loaded tube assemblies, which absorbs the stress like a spring. The tube assemblies also maintain contact with the radially deforming composite ring. As before, a disadvantage of this hub is that the critical velocity is less than the design operating velocity, which may subject the rotor to potentially deleterious vibrations.

Swett et al. (U.S. Pat. No. 5,732,603) discloses a flywheel rotor with an expansion-matched, self-balancing, fiber or matrix composite hub, which includes an annular hoop and a pair of compliant diaphragms that are connected by the hoop. The diaphragms include an annular spring, the compliance of which facilitates maintaining contact at the hub-ring interface. Once again, a disadvantage of this hub is that the critical velocity is less than the design operating velocity, which may subject the rotor to potentially deleterious vibrations.

Swett (U.S. Pat. No. 6,014,911) discloses a flywheel rotor with a self-expanding hub having a double cone configuration. As the flywheel rotates, the hub surfaces flex, creating compression at the rotor that prevents matrix material of the rotor from pulling apart at high velocities. Here again, a disadvantage of this hub is that the critical velocity is less than the design operating velocity, which may subject the rotor to potentially deleterious vibrations.

Waagepetersen (U.S. Pat. No. 5,946,979) discloses a flywheel with an expansive, thin-walled, conical or fructo-conical hub, which expansion is made possible by either attaching a flexible, fiber-reinforced plastic material at the end of the hub or adhesively connecting the hub directly to the ring. Here again, a disadvantage of this hub is that the critical velocity is less than the design operating velocity, which may subject the rotor to potentially deleterious vibrations.

Fullwood et al. (PCT WO 97/1313) discloses a conical, fiber-reinforced end cap ("hub") that deflects towards a planar configuration as the rotor speed increases. Such deflection ensures that the rotor and end cap maintain their initial strain. Here again, a disadvantage of this hub is that the critical velocity is less than the design operating velocity, which may subject the rotor to potentially deleterious vibrations.

SUMMARY OF THE INVENTION

Thus, it would be desirable to produce a flywheel hub for attaching a low-density, high-strength, high-growth composite rim to a rotating, high-strength, metal flywheel shaft in such a manner as to substantially maximize the energy storage capacity of the flywheel assembly; to substantially minimize loss of interference fit between the hub and composite rim at very high rotational speeds; and to substantially minimize potentially destructive or deleterious vibrations that may result therefrom.

Therefore, it is an object of the present invention to provide a stiff metal hub for connecting a high-strength metal flywheel shaft to a low-density, high-strength composite rim.

It is a further object of the present invention to provide a stiff metal hub that maintains interference fit with the composite rim at very high rotational velocities, minimizing separation.

It is another object of the present invention to provide a stiff metal hub that substantially minimizes vibrations during high speed operation of the flywheel.

It is a yet another object of the present invention to provide a stiff metal hub that produces a critical speed substantially greater than the design operating speed of the flywheel.

BRIEF DESCRIPTION OF THE DRAWINGS

For a fuller understanding of the nature and desired objects of the present invention, reference is made to the following detailed description taken in conjunction with the accompanying drawing figures wherein like reference character denote corresponding parts throughout the several views and wherein.

DETAILED DESCRIPTION OF THE INVENTION AND ITS PREFERRED EMBODIMENTS

Figure 1:
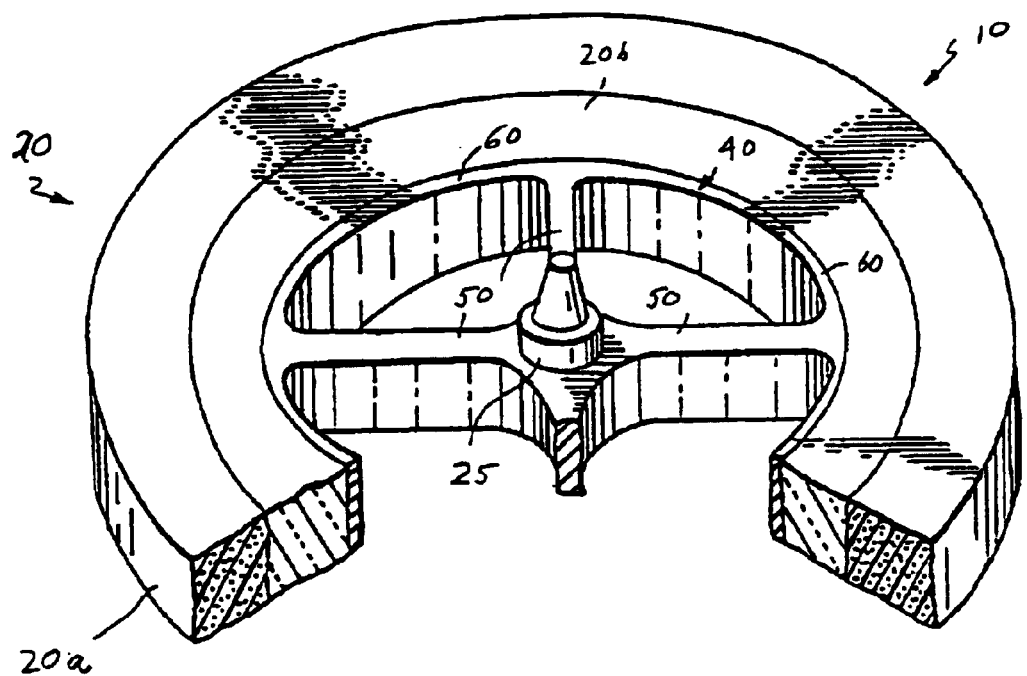
FIG. 1 is an illustrative example of a prior art hub from U.S. Pat. No. 4,860,611.

Flywheel-based energy storage devices 10 comprise relatively simple devices for readily storing and recovering energy. See FIGS. 1 through 3. Conceptually, as a flywheel 10 spins in a vacuum, mechanical kinetic energy is stored, e.g., primarily in the outermost portion (the "rim") of the flywheel assembly 10. The amount of energy stored in a flywheel assembly 10 is directly proportional to its mass and to the square of the rotational velocity of the flywheel 10. The rotational velocity of the flywheel 10 is largely responsible for the energy storage capacity due to the effect squaring the velocity has on energy storage. Hence, those of skill in the art are developing flywheels 10 that rotate at ever-increasing velocities.

Thus, those of ordinary skill in the art recognize an effective means to increase a flywheel assembly's 10 energy storage capacity is by maximizing rotational inertia by using high-tensile strength, low-density materials, e.g., composite fiber materials at the outermost, composite rim 20, where energy storage potential is greatest. However, use of flexible composite materials in combination with steel or stiff metal alloys is problematic. Indeed, the problem is one of compatibility.

The compatibility problem manifests as the composite rim 20 rotates at higher velocities, wherein centrifugal forces produce hoop and radial stresses that cause the composite rim 20 to "grow" radially. The rotary shaft 25 for all intents and purposes does not deform. Hence, the hub 40 must provide a support platform to the rotating, expanding composite rim 20 and maintain tight interference fit with the non-expanding rotary shaft 25 at all operating speeds. Implicit in supporting the composite rim 30 is a requirement to maintain substantial interference fit between the hub 40 and the rim 20, which is possible only if the hub 40 also grows radially. As a result, the hub 40 features that are most desirable for safe and satisfactory performance of the flywheel assembly 10 include: (i) high material strength to ensure that the hub 40 does not fail; (ii) sufficient flexibility to maintain tight interference fit with the radially-deforming composite rim 20; (iii) sufficient rigidity to maintain tight interference fit with the rigid, non-expansive rotary shaft 25; (iv) sufficient rigidity to maintain critical speeds well above operating speed; and (v) relatively low material density to substantially minimize stresses due to centrifugal forces.

Indeed, an ideal illustrative embodiment of the present invention comprises a hub 40 that is flexible enough to expand, or deform, radially commensurate with the growth of the composite rim 20 to maintain contact, i.e., tight interference fit, between the rim 20 and the hub 40, and a hub 40 that is rigid enough so that the critical velocity of the flywheel assembly 10 is substantially higher than flywheel 10 design operating speeds, which is to say, that during normal, or habitual, operation, the rotational velocity of the flywheel 10 does not approach the critical velocity of the flywheel assembly 10. As a result, suitable materials for hubs 40 include aluminum, steel, and titanium. From a cost perspective, however, aluminum is preferred over steel or titanium.

Flywheel hubs 40 of the prior art (FIG. 1), however, are typically not flexible enough to maintain tight interference fit between the composite rim 20 and the hub 40 during deformation; and/or are not stiff enough. Indeed, a common shortcoming of the prior art is that the critical velocity of a flywheel assembly 10 is much less than design operating speeds of conventional flywheel assemblies 10, which is to say that prior art flywheels almost universally expose the flywheel assembly 10 to potentially deleterious or damaging vibrations as the frequency of the flywheel rotor passes through its critical frequency before attaining its design operating frequency.

As an example, in FIG. 1 is shown the flywheel assembly 10 of Flanagan et al. (U.S. Pat. No. 4,860,611) comprising a rigid, metal shaft 25, a unitary, expandable metal hub 40, and composite rim 20, which includes an inner ring 20b and an outer ring 20a. The composite rim 20 of the Flanagan flywheel 10 is shrunk-fit around the expandable hub 40, which is characterized by a plurality of spokes 50 and rim sections 60 between adjacent spokes 50 that purposely have been made thinner to make the rim sections 60 more flexible.

Flanagan et al. addresses the incompatibility problem by pre-shrinking the composite rim 20 onto the hub 40 and, further, by keeping the critical velocity of the flywheel assembly 10 substantially lower than design operating speeds. Hence, at operating speeds less than or equal to critical velocity, the hub 40 and composite rim 20 maintain tight interference fit because of pre-shrinking. Moreover, at low operating speeds where tight interference fit is maintained, there should be minimal separation of the composite rim 20 from the hub 40, and, therefore, no vibrations near critical velocity to cause resonance. Flanagan et al. further teaches that at higher frequencies, which exceed the critical frequency, the point of resonance has already been passed so there is no further concern of resonance.

Figure 3:
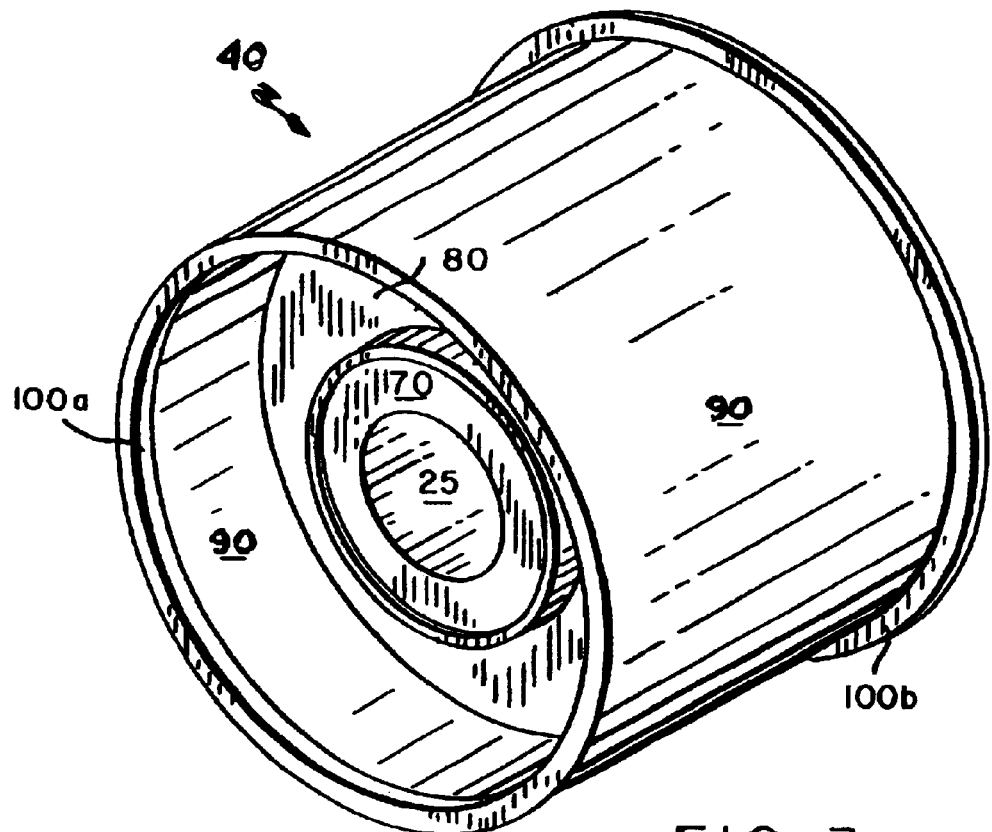
FIG. 3 is an isometric view of an illustrative embodiment of a stiff, metal hub for a rotating energy storage flywheel.
Figure 4:
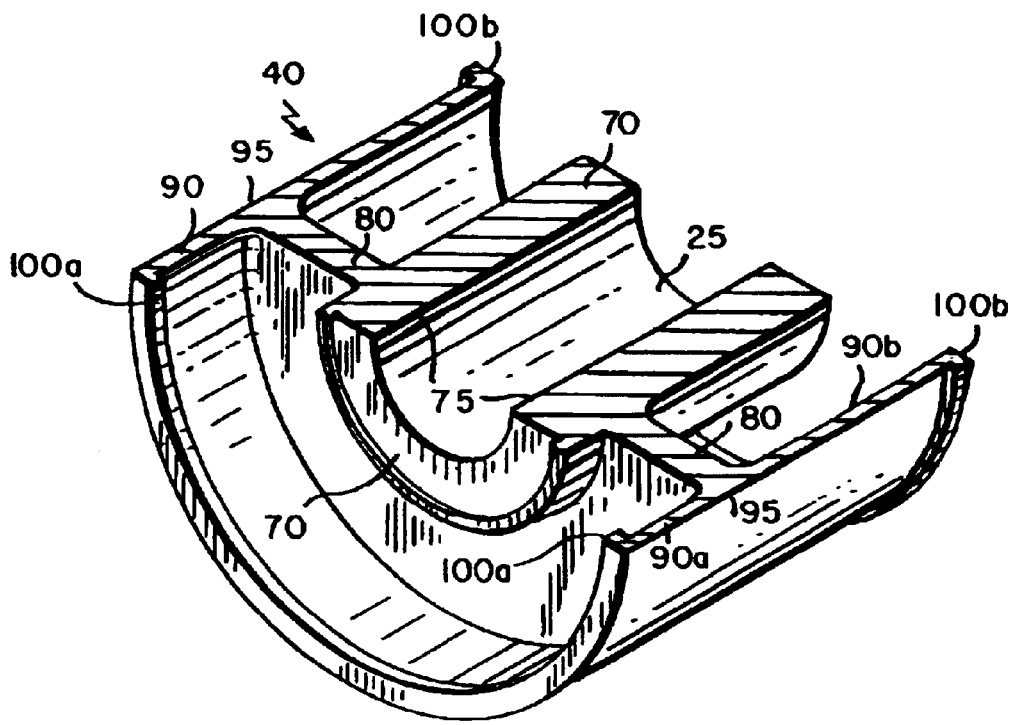
FIG. 4 is an cut-away isometric view of the illustrative embodiment of a stiff, metal hub for a rotating energy storage flywheel in FIG. 3.

By comparison, the metallic hub 40 of the present invention (FIGS. 2, 3, and 4) is appreciably stiffer than the Flanagan hub. The additional stiffness of the metallic hub 40 of the present invention is attributable to the material properties of the hub 40 as well as to its cross-section and dimensions. The hub 40 of the disclosed invention produces a critical velocity and critical frequency that exceed, respectively, the design operating speeds and frequencies of the flywheel assembly 10, which produces a factor of safety against resonance greater than unity. Critical velocity and critical frequency again are defined as the speed and frequency, respectively, at which deleterious resonance occurs.

In a preferred embodiment, critical velocity (or frequency) is between about 1.40 and about 3 times the, respective, design operating speed (or frequency) of the flywheel assembly 10, providing a factor of safety against resonance of between about 40 and 200 percent, respectively. As a result, whereas the Flanagan hub 40 teaches reaching the flywheel assembly's 10 critical velocity at a speed much less than design operating speed, the stiffness of the hub 40 of the present invention produces a critical velocity that is well above design operating speeds.

Hub 40 dimensions and material properties are typically determined interactively using, e.g., finite element analyses and subsequently validated by testing a prototype. For a working embodiment of the present invention, finite element software, e.g., ANSYS produced by Swanson Analytical Systems, is used to size the metallic hub 40 for a desired design operating velocity or frequency.

Indeed, in this illustrative working embodiment, a hub 40 for a design operating speed of about 22,500 revolutions per minute (RPM), which corresponds to a design operating frequency of 375 Hertz, is desired to provide the required energy storage capability. A factor of safety of, e.g., two (2) necessitates a critical velocity of about 45,000 RPM, which corresponds to a critical frequency of 750 Hertz. In this illustrative example, the hub 40 is made from aluminum. It should be understood, however, that those of ordinary skill in the art may practice the present invention using higher or lower design operating speeds, higher or lower factors of safety, and/or different materials without deviating from the scope and spirit of the present invention.

The hub 40 of the present invention has a central core 70 in tight interference fit with a rigid, rotary shaft 25. The hub 40 is shrunk-fit onto the rigid, rotary shaft 25 by immersing the rotary shaft 25 in liquid nitrogen and heating the central core 70, e.g., in a furnace, to about 250 degrees Fahrenheit. When the supercooled shaft 25 and heated central core 70 have been joined and reach ambient and/or design operating temperatures, there is about an 11 mil interference fit tolerance diametrically.

Dimensions of the central core 70 (length and width) will vary as a function of the design operating speed and frequency of the flywheel 20. At relatively high operating speeds, a portion of the central core 75, which is located directly beneath the web 80, pulls away, or separates, from the rotary shaft 25 creating a holiday, or gap. For that reason, to maintain stability, enough of the central core 70 must remain in tight interference fit with the rotary shaft 25 to arrest any tendency of the rotary shaft 25 to vibrate. In the illustrative, preferred embodiment, for a design operating speed of about 22,500 RPM (375 Hertz), a tight interference fit between the central core 70 and the rotary shaft 25 is maintainable if at least about 1.8 inches of the central core 70 remain in tight interference fit with the rotary shaft 25. Finite element analysis of these design parameters requires a central core 70 thickness of about 1.3 inches and a length of about 6.7 inches.

Extending radially from the central core 70 is a continuous web 80 of approximately uniform thickness. The web 80 flares out near where the web 80 joins the central core 70 and the outer rim 90. The material properties, the thickness, and continuous nature of the web 80 principally provide the stiffness and rigidity to the hub 40. For that reason, the thicker the web 80, the stiffer the hub 40. Moreover, thicker webs 40 support higher critical velocities. By comparison, the plurality of spokes 50 associated with Flanagan et al. of the prior art is not continuous and less rigid. Consequently, the critical velocity of the prior art is less than the design operating speeds of prior art flywheels 10.

In a preferred embodiment, rotary shafts 25 supported by mechanical bearings (not shown) require a web 80 thickness that produces at least about a 40 percent speed margin, i.e., critical frequency should be about 40 percent greater than design operating frequency. As a result, for a shaft 25 supported by mechanical bearings and a design operating frequency of about 375 Hertz, the critical frequency for design is about 525 Hertz. Finite element analysis of these design parameters requires a web 80 thickness of about ⅞ inch (0.875 in.).

In another embodiment, rotary shafts 25 supported by active magnetic bearings (not shown) require a web 80 thickness that produces at least about a 200 percent speed margin, i.e., critical frequency should be about 200 percent greater than design operating frequency. Hence, for a shaft 25 supported by active magnetic bearings and a design operating frequency of about 375 Hertz, the critical frequency for design is about 750 Hertz. Finite element analysis of these design parameters requires a web 80 thickness of about 2.4 in. It should be noted that those of ordinary skill in the art may practice the present invention on other flywheel assemblies 10 at virtually any design velocity and/or frequency without violating the scope or spirit of this disclosure.

The web 80 is connected to a relatively thin, flange-like outer rim 90. The outer rim 90 is in tight interference fit with the composite rim 20, which has been shrunk-fit to provide the tight interference fit. The composite rim 20 can be fit onto the outer rim 90 in any manner. In an illustrative embodiment, the composite rim 20 is immersed in liquid nitrogen and then placed on the outer rim 90, providing an interference fit with a 35 mil tolerance diametrically.

The dimensions of the outer rim 90 will vary according to the dimensions, design energy storage capacity, and design operating speed of the flywheel 10 as well as the hub's 40 material properties. Thus, variations in these parameters can be made by those skilled in the art without departing from the teachings of this invention.

At very high operating speeds, a portion of the composite rim 95, which is located directly beneath the web 80, pulls away, or separates, from the outer rim 90 creating a holiday, or gap. For that reason, to maintain stability, enough of the outer rim 90 must remain in tight interference fit with the composite rim 20, to minimize vibrations. In one embodiment, a tight interference fit between the outer rim 90 and the composite rim 20 can be maintained if each leg of the flange 90a, 90b is about 5 inches in length, for a total length, including the web 80 thickness, of about 11 inches, when the shaft 25 is operating at a design frequency of about 375 Hertz. However, longer, shorter, and unequal flange leg 90a, 90b lengths are possible with the present invention as long as enough of the outer rim 90 remains in contact with the composite rim 20.

The thickness of the outer rim 90 of the present invention is roughly uniform except in vicinity of the web 80. Indeed, finite element analysis of these design parameters requires an outer rim 90 thickness of about 0.403 inches. The outer rim 90 is substantially longer than the central core 70 because centrifugal forces at the outer rim 90 are greater due to the substantially longer moment arm from the axis of rotation (not shown) to the outer rim 90. Moreover, the coefficient of friction between the steel rotary shaft 25 and the hub 40 is greater than the coefficient of friction between the composite rim 20 and the hub 40. Hence, a longer surface is needed to provide the same amount of frictional resistance at the outer rim 90 as at the central core 70.

A pair of rails 100a and 100b are oriented approximately normal to the surface of the outer rim 90. One rail 100b serves as an axial stop and is directed away from the shaft 25 and towards the composite rim 20. The axial stop rail 100b provides additional protection against the composite rim 20 falling off of the hub 40 during high-speed rotation. Indeed, at very high speeds, the hub 40 and the composite rim 20 grow radially but shrink axially. If the hub 40 shrinks more than the composite rim 20, then, potentially, the composite rim 20 may slide off of the outer rim 90. Positioning an axial stop 100b in the direction of precess provides greater assurance against the composite rim 20 falling off of the outer rim 90 of the hub 40.

The other, balancing rail 100a, which is directed away from the composite rim 20 and towards the shaft 25, is provided to help balance the hub 40. By its design, e.g., dimensions, and/or by applying balancing weights (not shown) thereto, the balancing rail 100a helps to prevent imbalances that could create deleterious vibrations. In another embodiment, an additional balancing (not shown) rail may be added beneath the axial stop 100b. Finite element analysis of these design parameters requires a rail length of about 0.25 in. and a width of about 0.107 in., wherein the width is measured in a direction that is normal to the surface of the outer rim 90.

Figure 2:
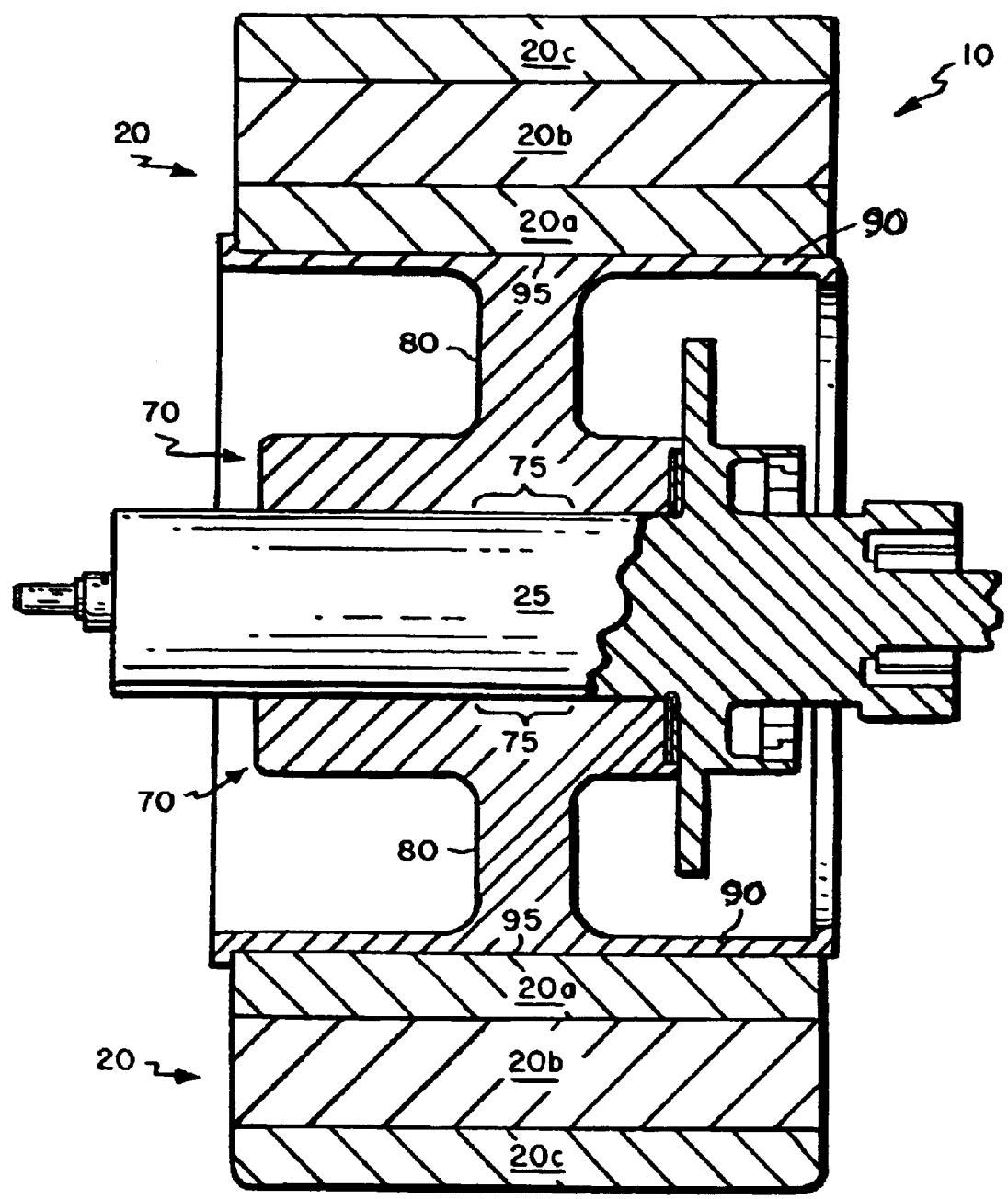
FIG. 2 is illustrative embodiment of a stiff, metal hub for a rotating energy storage flywheel.

The composite rim 20 may include any number of coaxial rings 20a, 20b, 20c. The prior art (FIG. 1) shows a bi-annular rim 20 with an inner ring 20b and an outer ring 20a, FIG. 2 shows a tri-annular rim 20 comprising an inner ring 20a, a middle ring 20b, and an outer ring 20c. In a number of different embodiments, the number of rings comprising the composite rim 20 of the present invention ranges from one (1) to five (5). However, there is no reason why more than five rings cannot be used in a composite rim 20.

The hub 40 of the present invention may be fabricated from any high-strength metal or alloy. In a preferred embodiment aluminum is the most economical material for the hub 40. However, steel and titanium also work well.

The following table summarizes results from finite element analyses for an aluminum hub 40 with an assumed design operation speed of 22,500 RPM (375 Hertz):

|  | Factor of Safety = 1.4 |
| --- | --- |
| Critical Velocity (RPM) | 31,500 |
| Critical Frequency (Hz) | 525 |
| Overall Diameter of Hub | 12.596 in. |
| LengthofouterRi | 10.920 in. |
| Thickness of Outer Rim | 0.403 in. |
| Web Thickness | 0.875 in. |
| Length of Central Core | 6.700 in. |
| Thickness of Central Core | 1.307 in. |

The rotary shaft 25 of an energy storage system incorporating the present invention is capable of attaining operating speeds of about 22,500 RPM (375 Hertz), which stores substantially more kinetic energy in the flywheel 10. At relatively low rotating speeds, the effect of rotation on the composite rim 20 is minimal, i.e., there is negligible or no deformation of the composite rim 20. As rotational velocity increases, the composite rim 20 may begin to deform radially. As the composite rim 20 deforms, the outer rim 90 of the stiff metal hub 40 deflects commensurately, which accomplishes two things. First, the deflection of the hub 40 maintains tight interference fit between the hub 40 and composite rim 20. This minimizes any wear and tear between the hub 40 and the composite rim 20. Moreover, and secondly, a tight interference fit substantially minimizes vibrations, which could be detrimental or destructive to the rotary shaft 25 or other parts of the energy storage system. Because the hub 40 is stiff, the critical velocity, by design, is greater than design operating speeds. Hence, even if a flywheel 10 produces vibrations, there is virtual certainty that the vibrations will not produce resonance.

While a number of embodiment of the invention has been described, it should be obvious to those of ordinary skill in the art that other embodiments to and/or modifications, combinations, and substitutions of the present invention are possible, all of which are within the scope and spirit of the disclosed invention.

What is claimed is:

1. A stiff, metallic hub for an energy storage device, having a flywheel assembly, wherein the hub produces a critical velocity that exceeds a design operating speed of the flywheel assembly, the stiff, metallic hub comprising:

a central core in tight interference fit with a rotary shaft of the flywheel assembly;

an outer rim section in tight interference fit with a high-strength, low-density composite fiber rim of the flywheel assembly; and a substantially planar web section, wherein the web section is circumferentially continuous, the web section is integrally formed to the central core and the outer rim section, the web section is substantially planar when the hub is at rest, the entire web section extends in a radial direction, and the web section has a substantially constant thickness in an axial direction.

2. A stiff, metallic hub as recited in claim 1, wherein the outer rim includes an axial stop to prevent the composite fiber rim from falling off of the outer rim of the hub during high speed operation.

3. A stiff, metallic hub as recited in claim 1, wherein the hub is manufactured of material selected from the group comprising aluminum, titanium, and steel.

4. A stiff, metallic hub as recited in claim 1, wherein said central core has a predetermined length whereby a predetermined minimum amount of said central core remains in tight interference fit with said shaft during operation of said hub.

5. A stiff, metallic hub as recited in claim 1, wherein the critical velocity is between about 1.4 and about 3.0 times the design operating speed of the flywheel assembly.

6. A stiff, metallic hub as recited in claim 1, wherein at high operating speeds, the outer rim section is capable of deforming in a radial direction commensurate with radial deformation of the composite fiber rim of the flywheel assembly to maintain a tight interference fit to substantially minimize vibrations.

7. A stiff, metallic hub as recited in claim 1, wherein the design operating speed of the flywheel assembly is about 22,500 revolutions per minute.

8. A stiff, metallic hub as recited in claim 1, wherein the central core has a critical length to maintain a tight interference fit with the rotary shaft of the flywheel assembly, wherein the critical length is about 1.8 inches at an operating speed of about 22,500 revolutions per minute.

9. A stiff, metallic hub as recited in claim 1, wherein the outer rim section has a critical length to maintain a tight interference fit with the composite fiber rim of the flywheel assembly, wherein the critical length is about 10 inches for an operating speed of about 22,500 revolutions per minute.

10. A stiff, metallic hub as recited in claim 1, wherein the web section has a thickness of about ⅞ inch at an operating speed of about 22,500 revolutions per minute when the rotary shaft is supported by mechanical bearings.

11. A stiff, metallic hub as recited in claim 1, wherein the web section has a thickness of about 2.4 inches at an operating speed of about 22,500 revolutions per minute when the rotary shaft is supported by magnetic bearings.

12. A stiff, metallic hub as recited in claim 1, wherein the outer rim includes at least one balancing rail for balancing the flywheel assembly to substantially minimize vibrations.

* * * * *